United States Patent [19]

McNicholas

[11] 4,375,975
[45] Mar. 8, 1983

[54] CENTRIFUGAL SEPARATOR

[75] Inventor: James J. McNicholas, East Brunswick, N.J.

[73] Assignee: MGI International Inc., Morris Plains, N.J.

[21] Appl. No.: 156,638

[22] Filed: Jun. 4, 1980

[51] Int. Cl.³ .............................................. B01D 45/00
[52] U.S. Cl. ............................................ 55/1; 55/93; 55/257 C; 55/228; 55/406; 261/112; 261/118; 415/91
[58] Field of Search ................. 55/1, 89, 278, 93, 228, 55/257 C, 406–408, 241; 415/91; 261/112, 118

[56] References Cited

U.S. PATENT DOCUMENTS

| Re. 13,090 | 3/1910 | Howard | 55/278 |
|---|---|---|---|
| 1,480,775 | 1/1924 | Marien | 55/230 |
| 2,284,632 | 6/1942 | Betts | 415/91 |
| 2,337,983 | 12/1943 | Fischer | 55/241 |
| 3,141,750 | 7/1964 | Hungate | 55/257 C |
| 3,191,364 | 6/1965 | Sylvan | 55/257 C |
| 3,258,895 | 7/1966 | Wieke et al. | 55/1 |
| 4,231,771 | 11/1980 | Winsche | 55/408 |

FOREIGN PATENT DOCUMENTS 899143  12/1953  Fed. Rep. of Germany ........ 55/408

*Primary Examiner*—Bernard Nozick
*Attorney, Agent, or Firm*—H. Hume Mathews; Ronald G. Goebel

[57] ABSTRACT

A centrifugal separator cleans a stream of fluid by passing the same through a rapidly rotating tapered duct. Rotation of the duct creates centrifugal force which causes pollutants carried by the stream to collect on a duct wall and to flow along the wall in a direction opposite to the direction of flow of the fluid through the duct.

2 Claims, 6 Drawing Figures

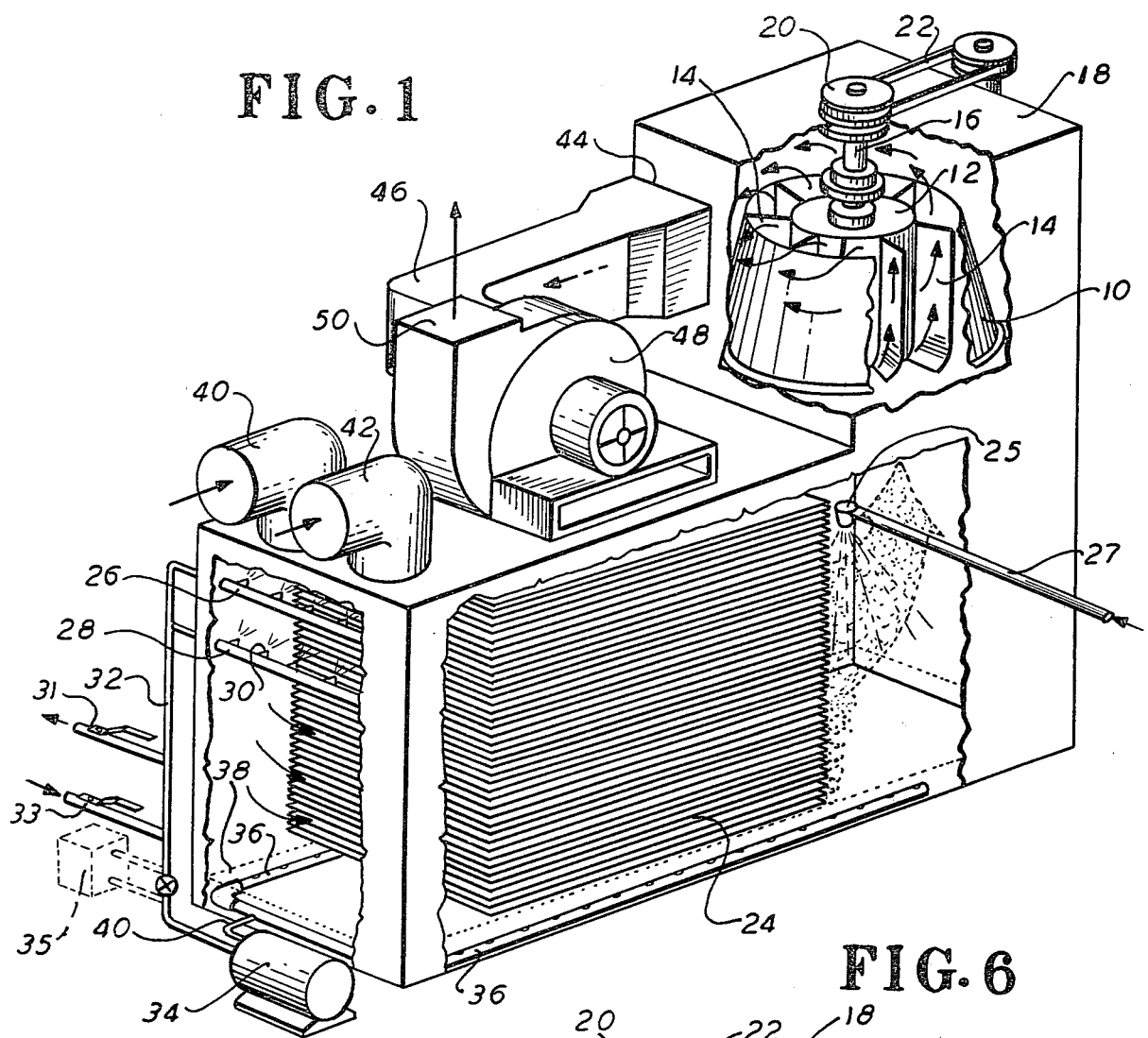
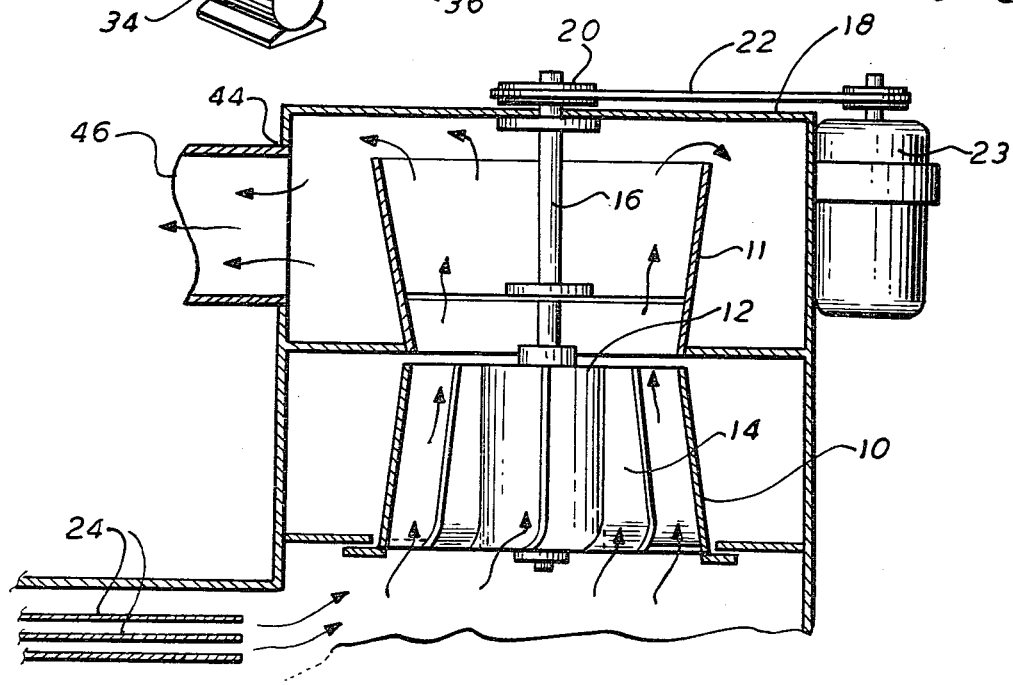

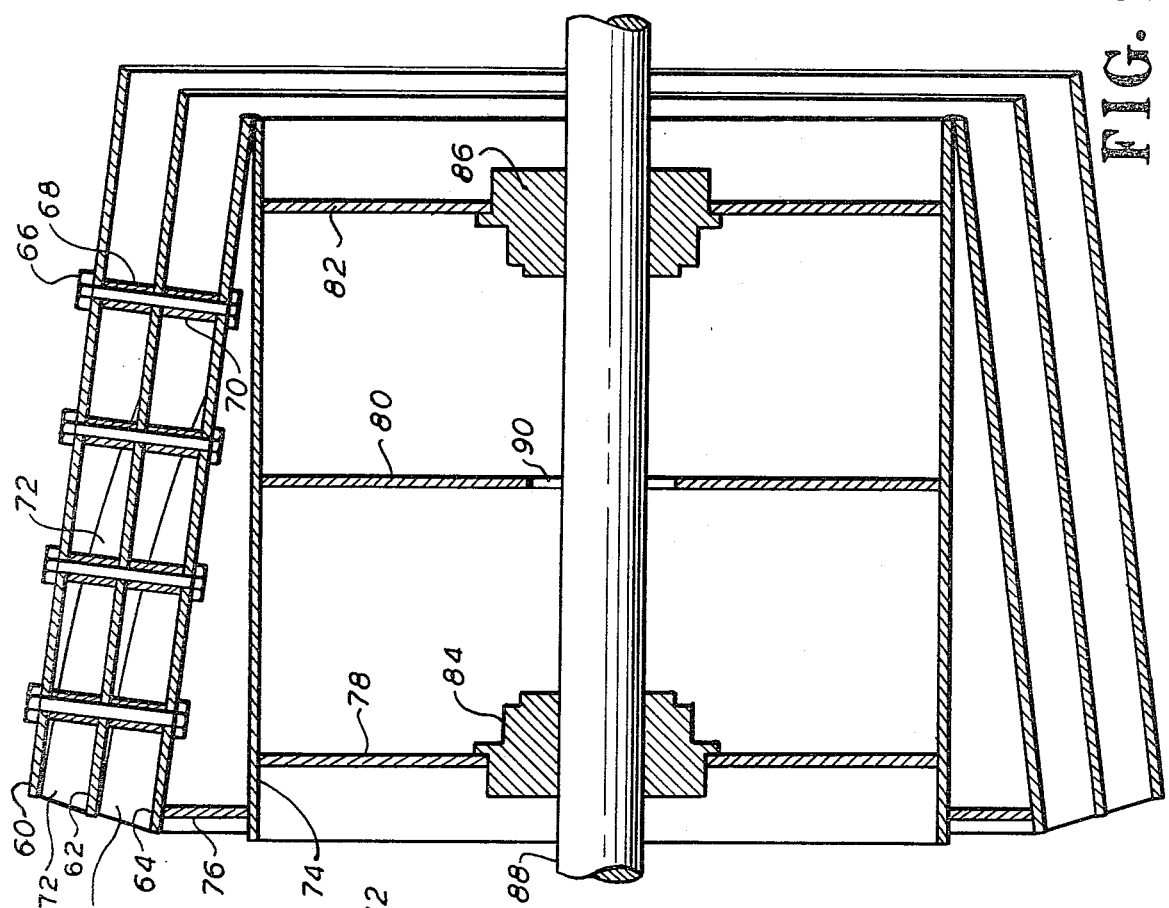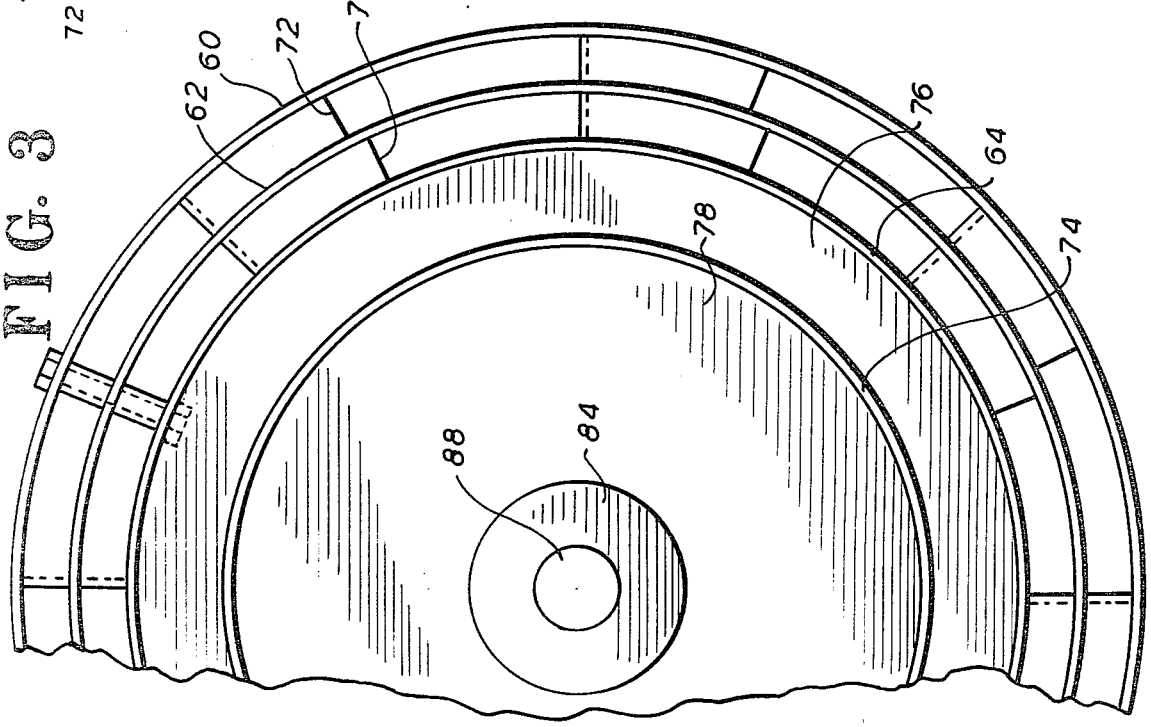

CENTRIFUGAL SEPARATOR

BACKGROUND OF THE INVENTION

The present invention relates to centrifugal separators and in particular, to devices that remove particles or other constituents by radially impelling the particles or other constituents out of a contaminated stream of fluid.

A known centrifugal scrubber employs a cylindrical housing having a tangential inlet port into which a contaminated stream is injected. Because of the manner of injection, the stream flows helically through the housing before exiting from an outlet port. These scrubbers typically spray into the stream a scrubbing liquor to facilitate removal of pollutants from the stream. Dynamic wet scrubbers are also known and these devices employ a fan-like device into which is injected a contaminated fluid stream together with a spray of scrubbing liquor.

Also known in the art are separators which employ nested conical frustrums which are spun as a stream of contaminated air flows between them. These nested structures are perforated to allow particles, droplets, and other effluents adhering to their surface to pass outwardly and be captured in a surrounding housing.

A disadvantage of the foregoing devices is a significant pressure drop occurring across the unit. Also many of these devices fail to control the vortex to reduce energy-consuming turbulence. In addition, known devices drive captured particles or other pollutants in the same direction as the incoming stream of contaminated fluid, thereby increasing the likelihood of re-entrainment. Further, they do not remove all or substantially all the particles or other pollutants from the contaminated stream.

Therefore, there is a need for a relatively simple and efficient device for separating particles or other pollutants, including particles down to sub-micron size, from a contaminated stream of fluid without risking re-entrainment of removed pollutants.

SUMMARY OF THE INVENTION

In accordance with the illustrative embodiments demonstrating features and advantages of the present invention, there is provided a centrifugal separator apparatus for cleansing a stream of fluid. The separator includes a tapered fluid passage or conduit having an inlet and an outlet. The passage is bounded by a tapered wall which is rotatably mounted to provide a converging rotatable fluid passage from the inlet to the outlet.

Also, according to the present invention, there is provided a method for separating particles entrained in a fluid by means of a tapered, rotatable conduit or duct. The method includes the step of directing the fluid into the conduit in the same direction as that of its taper. Another step is rotating the conduit to radially impel the entrained particles against the inside of the conduit and then to remove the particles by causing them to flow in a direction opposite to the direction of flow of the fluid, to a particle exit.

According to a related aspect of the present invention, there is provided an apparatus for cleansing a stream of fluid comprising a vortex means having an inside surface that converges in a downstream direction. This vortex means includes a means for radially impelling the fluid against its inside surface. The vortex means may have a plurality of internal baffles, and a portion of each baffle may be skewed with respect to the axis of rotation of the vortex.

By employing the foregoing apparatus, and method, a relatively efficient separator is provided. This separator preferably employs a spinning frustro-conical drum having internal baffles that guide incoming fluid towards an outlet and assures that all fluid is brought to rotational speed. This drum can be tapered from its inlet to its outlet so that particles driven against its inside surface tend to reverse their direction of flow and migrate towards the wider end (inlet) of the drum.

Preferably, the spinning drum comprises nested frustroconical conduit sections with a plurality of interstitial baffles having curled leading edges. This feature simultaneously draws in air, reduces turbulence, and develops a radial centrifugal force field for particle separation.

In one embodiment a scrubbing liquor is sprayed into an incoming stream of contaminated air to capture entrained particles and/or gaseous constituents. The particulates of the mixture are then radially impelled and captured by the above-mentioned spinning drum. The captured scrubbing liquor emerges at the wider end of the drum and may be recycled to the sprayer.

In the preferred embodiment the spraying occurs upstream of a plurality of stacked, spaced plates which precede the spinning drum. These plates provide first surfaces onto which heavy droplets of spray can settle. Thus, the plates provide an initial site for capture of particles and droplets that have seized or captured pollutants. An advantage of the plates is that they are passive, require low energy, and promote uniform flow to reduce turbulence.

In the preferred embodiment the drum is spun on a vertical axis, its narrow end up. Incoming air is then drawn upwardly while particles, liquid droplets and other contaminants are then impelled radially outwardly and then downwardly. Since this reversed flow is downward, the force of gravity assists the separation process.

BRIEF DESCRIPTION OF THE DRAWINGS

The above brief description, as well as other objects, features and advantages of the present invention will be more fully appreciated by reference to the following detailed description of presently preferred, but nonetheless illustrative embodiments, when taken inconjunction with the accompanying drawings wherein:

FIG. 1 is a perspective view of a separator according to the present invention.

FIG. 2 is a sectional view of an alternate construction which may be employed in the separator of FIG. 1;

FIG. 3 is a left end view into the base of FIG. 2.

FIG. 6 is a sectional view illustrating a variation of the separator shown in FIG. 1.

DETAILED DESCRIPTION OF THE PREFERRED EMBODIMENTS

Figure 5:
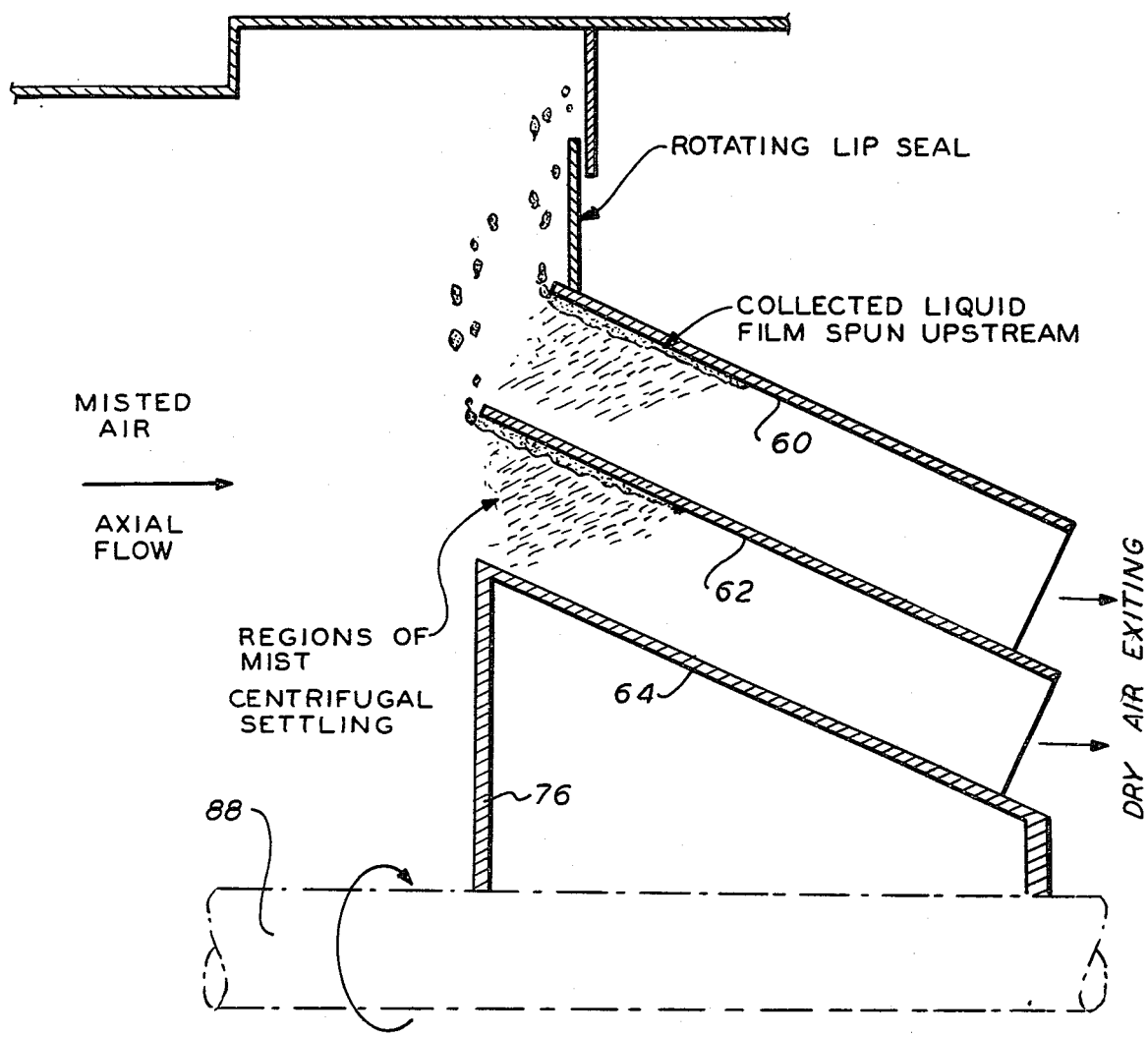
FIG. 5 is a schematic view shoing the mode of operation of the construction of FIGS. 2 and 3.

Referring to FIG. 1, a vortex means is shown herein as a tapered passage or conduit comprising an outer frustroconical wall 10 and an inner cylindrical wall 12. The interspace between walls 10 and 12 defines an airway in which a plurality of internal baffles 14 are mounted, sixteen in this embodiment. In this embodiment, outer wall 10 and inner wall 12 are formed of sheet steel (preferably stainless steel) and are welded to baffles 14. As will be clear from subsequent description, baffles 14, which have a curled leading (lower) edge, are operable as a means to radially impel the fluid passing through the spaces between the walls against the inside surface of outer wall 10. Walls 10 and 12 are rotatably mounted on shaft 16 which is journaled in housing 18. Shaft 16 is journaled at its mid portion in a bracket-supported bearing (not shown) mounted within housing 18. The upper end of shaft 16 terminates in an external pulley 20 which, together with a drive belt 22, provides a means for rotating walls 10 and 12 by a motor 23 (FIG. 6). The conduit formed by walls 10 and 12 is rotated clockwise (viewed from above) so that baffles 14 scoop air upwardly through sleeve 10. In this embodiment, housing 18 is a rectangular sheet metal box having an upper rectangular section in which sleeve 10 is mounted. It will be appreciated, however, that for other embodiments the shape of housing 18 may be altered depending upon the elements mounted therein, the shape of the conduit formed by walls 10, 12 and the required compactness, capacity, weight constraints, etc. It is to be appreciated that for other embodiments shapes other than the foregoing may be employed instead. For example, inner wall 12 may be eliminated and baffles 14 may be sized to intercept the supporting shaft 16. Also, the number of baffles may be varied depending upon the desired flow rate, fluid density, spin rate, etc. Furthermore, wall 10 and its other components may be assembled, rather than by welding, by other fastening means such as, rivets, bolts, etc. In addition, while baffles 14 are shown as vertical planes having a curled lower end, in other embodiments these baffles may be planar and skewed at an angle with respect to the axis to the rotation of the conduit. Aerodynamic shapes may be used for baffles 14.

In the embodiments of FIGS. 1 and 6, a plurality of settling plates 24 are mounted in the lower upstream portion of housing 18. These plates comprise a large number of parallel spaced plates (forty or more, with a one inch spacing, in the embodiment illustrated) which are downwardly inclined in a downstream direction. It is to be appreciated that in other embodiments the plates may be non-rectangular and/or non-planar. They may be omitted for some applications. Mounted upstream of settling plates 24 is a spraying means shown herein as a pair of spraying manifolds 26 and 28 each having a plurality of nozzles 30. Nozzles 30 produce a finely divided spray of liquid, such as water. This liquid is supplied by means of pipes 32 which are fed by a circulation means shown herein as sump pump 34. Pump 34 draws liquid by means of perforated pipe 36 from the sump 38 at the bottom of housing 18 into conduit 40, the input line of pump 34.

Housing 18 has a pair of inlet ports to which are connected a pair of inlet ducts 40 and 42. An outlet port 44 in housing 18 is connected to output duct 46 connected to the inlet of blower 48 which operates to pump the fluid through the separator apparatus. Blower 48 has an exhaust duct 50 which returns cleansed air or fluid to the environment. A filter 35 may be provided to clean the fluid being returned from sump 38 to spray nozzles 30.

A clean water (or other liquid) spray may also be provided, downstream, of the settling plates 24, as shown at 25. Water or liquid for spray 25 is provided from a separate source through pipe 27.

Referring to FIGS. 2 and 3, an alternate frustoconical conduit is illustrated which may be substituted for that described in FIG. 1. The conduit comprises a nested trio of spaced walls 60, 62, and 64, each having a frustoconical shape. Walls 60, 62, and 64 are bolted together by a plurality of bolts such as bolt 66. Bolt 66 is surrounded by upper busing 68 and lower bushing 70, which bushings act as spacers for walls 60, 62 and 64. Mounted in between walls 60, 62, and 64 are a plurality of baffles 72. In this embodiment baffle 72 comprise 32 planar elements, sixteen on each side of wall 62. Baffles 72 are skewed with respect to the axis of rotation of walls 60, 62 and 64 and spiral counterclockwise (as viewed in FIG. 3). Walls 60, 62 and 64 are mounted on a central barrel 74, an annular spacer 76 being welded between barrel 74 and the larger end of wall 64. Barrel 74 is mounted on annular supports 78, 80, and 82. Supports 78 and 82 are mounted on hubs 84 and 86 respectively. Hubs 84 and 86 are mounted on rotatable shaft 88. Support 80 has a concentric apperture 90 through which shaft 88 passes.

Figure 4:
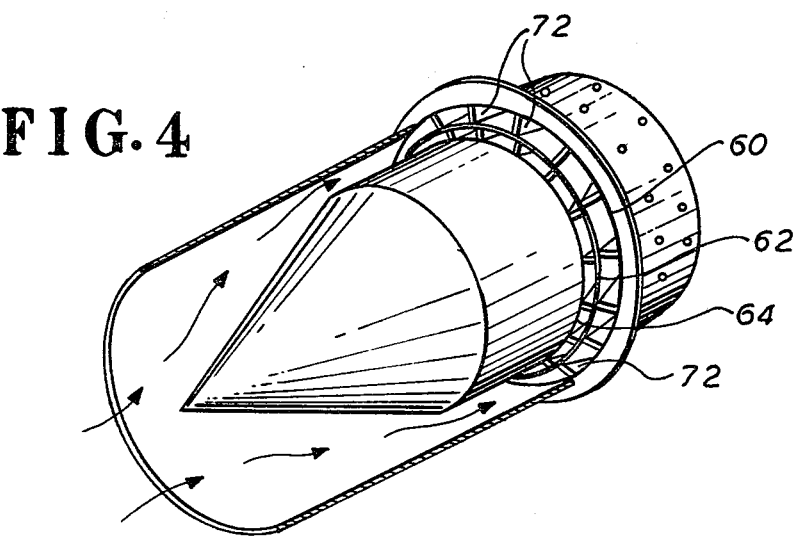
FIG. 4 is a perspective view of an inlet arrangement for the construction of FIGS. 2 and 3.

FIG. 4 shows how the incoming contaminated fluid may be introduced into the spinning conduit of FIGS. 2 and 3.

In the variation shown in FIG. 6, cleansed fluid passing out of the converging conduit defined by the tapering outer wall 10 is discharged into a diffuser section 11 which decreases the velocity and increases the pressure of the fluid passing therethrough, thus increasing the overall efficiency of the separator apparatus.

To facilitate an understanding of the principles associated with the apparatus of FIG. 1 (and of FIGS. 2 and 3) its operation is shown schematically in FIG. 5, and will briefly be described below.

Typically a fluid such as contaminated air containing particles, droplets, gaseous pollutants and other contaminants is drawn in through inlet ducts 40 and 42 into housing 18. The incoming air is then sprayed by nozzles or other methods of drop generation (such as a spinning disc impinger) with a scrubbing liquor (such as water) supplied by manifolds 26 and 28. The liquid sprayed may be one which will react with the gaseous contaminants contained in the incoming contaminated stream so that the gaseous contaminants are transferred to the liquid. The spray from nozzles effectively produce an extremely large liquid surface area by finely dividing the liquid. Accordingly, the incoming contaminated fluid, usually air, contacts a relatively large liquid surface area so the absorption of gaseous contaminants and adhesion of particulate contaminants occurs quickly and efficiently.

The sprayed mixture passes through the stacked settling plates 24 which are canted slightly downward. As a result, the larger liquid droplets and particles (for example, above 40 microns in size) settle and fall upon the surfaces of settling plates 24, thereafter flowing into the bottom reservoir or sump 38 of housing 18. The bottom of the reservoir is bled by drains 36 to pump 34 which recirculates the collected liquid through spray nozzles 30. The liquid may be cleaned by filter 35 before being re-sprayed.

Inlets and outlets 33, 31 may be provided to add or remove water or other scrubbing liquid to or from the system.

The unremoved portion of contaminants leaving settling plates 24 is drawn through the centrifugal separator 10, 12 and 14, which is being spun at a relatively high angular velocity. The resultant centrifugal force on the particles and liquid droplets (mist) in the fluid stream causes rapid outward separation of denser constituents to the inner surface of wall 10. Accordingly, particles and finely divided liquid droplets collect on the inner surface of wall 10, as shown in FIG. 5. It is to be appreciated that because of the high angular velocity of wall 10, and because the wall converges in the direction of fluid flow, there will be a force component on each particle or droplet in a backward direction opposite to the direction of fluid flow. Therefore, the spinning of wall 10 causes contaminants collected on its inside surface to migrate downwardly until they are spun off the lower edge of wall 10 (or walls 60, 62 in FIG. 5. These contaminants then fall to the bottom of housing 18, collecting in the reservoir or sump 38 inside the bottom of housing 18.

The taper on the inside of the outer duct wall may range from a minimum of about 1 degree to a maximum of about 40 degrees inclination with respect to the axis of rotation. The construction should be such as to allow contaminants to be collected on the inside wall surface and then flowed backwardly with respect to the direction of gas flow.

It will be appreciated that since the baffles 14 have a curled lower edge they act as airfoils to smoothly draw fluids inwardly and immediately impart to them an angular as well as an axial velocity. This feature reduces the pressure drop across sleeve 10 and thus the work required to circulate the air throughout housing 18. Moreover, the airfoil design of baffles 14 reduce the turbulence at the upper or output end of the conduit formed by walls 10 and 12. This further reduces the work required since less energy is wasted on producing non-productive turbulence. Additionally, the spinning of wall 10 and its baffles 14 causes collision between those elements and droplets giving rise to greatly increased liquid surface area and it captures extremely fine particles of low micron sizes. Baffles cause pressure increase, which causes air to flow backwards through the seal area (FIG. 5) thereby keeping liquid from bypassing the separator.

As a result of the foregoing operation, the fluid or airstream leaving conduit 10, 12 is a demisted, cleansed airstream. This airstream is drawn through outlet port 44 into duct 46 by blower 48. Blower 48 exhausts the cleansed air through duct 50.

The foregoing apparatus can be used in many chemical processes which require cleansing of contaminated fluids. The particular liquid being sprayed may be chosen with regard to the particular contaminants in the fluid stream to be cleansed. For example, the sprayed liquid may react with $H_2S$. If one of the major contaminants to be removed is a liquid mist it may be unnecessary to employ a spraying device, the contaminating mist serving the same mechanical function. For example, the contaminant mist may have sufficient particle affinity that the mist itself coalesces and is removed by the centrifugal separator.

It is anticipated that for some embodiments the foregoing apparatus may be used to cleanse contaminants from a liquid. In this instance, the liquid input is through nozzles 30. A stripping gas is supplied through inlet ports 40 and 42 to remove contaminants from the sprayed liquid. The cleansed liquid is then separated by separator 10, 12 and drawn off by pump 34. The cleansed liquid may not be recirculated but may be returned to a storage tank. Alternatively, the liquid purity may be boosted by continually recirculating it. The stripping gas, laden with the contaminant may then be drawn out by duct 50 and supplied to another separator constructed in the same manner as the apparatus in FIG. 1. The latter separator may employ a liquid to remove the contaminants from the stripping gas as previously described.

In some embodiments it is expected that liquid 38 in sump 38 may be decontaminated by another separator constructed similarly to that of FIG. 1. In this situation the contaminated liquid is sprayed, mixed with a stripping gas, and routed to a spinning convergent conduit to separate the cleansed liquid and deliver it to a reservoir.

Many chemical processes require an effective mass transfer of constituents between a gaseous and a liquid medium. It is anticipated that the LeChatelier Principle may be utilized by the separator of this invention to shift a reaction equilibrium, thereby, withdrawing a contaminant. For example, a reaction of gas mixtures such as $CO + H_2O \rightleftharpoons CO_2 + H_2$ may be assisted with the separator of the present invention. By adding a liquid which absorbs either $CO_2$ or $H_2$, the reaction may be completed in a manner which would not otherwise occur. Thereafter, the separator can remove the liquid constituents from the gaseous phase.

It is to be appreciated that alterations and modifications may be made of the apparatus above described. For example, the shape of the convergent spinning conduit employed may be altered to a bell or other curved shape. Furthermore, the dimensions of various components may be altered depending upon the desired capacity, flow rate, temperatures, etc.

The convergent spinning conduit may be rotated at different angular velocities, to produce centrifugal force within the range from 100 to 1000 Gs, to provide best efficiency under various operating conditions.

Obviously, many modifications and variations of the present invention are possible in the light of the above teachings. It is therefore to be understood that within the scope of the appended claims, the invention may be practiced otherwise than as specifically described hereinabove.

What is claimed is:
1. A centrifugal separator for removing fluid denser constituents from a fluid comprising:
  (a) a housing having a fluid passage located therein, said passage having an inlet and an outlet;
  (b) a duct rotatably mounted in said fluid passage and having an outer wall tapered toward the axis of rotation in the direction of fluid flow;
  (c) a plurality of substantially planar and parallel internal baffles extending radially inside said duct to said outer wall and being parallel to the axis of rotation of said duct;
    whereby rotation of said tapered duct at high angular velocities provides centrifugal forces capable of causing outward separation of said fluid denser constituents in said duct and causes said fluid denser constituents to move in a direction opposite to the direction of fluid flow; and
  (d) means located in said fluid passage between said inlet and said duct for deflecting said fluid stream to separate large fluid denser constituents from said stream before entry into said duct.
2. A method for removing fluid denser constituents from a fluid stream comprising deflecting said fluid stream to separate large fluid denser constituents from said stream, rotating said fluid stream in a rotating duct having an outer wall tapered in the direction of fluid flow and containing a plurality of substantially planar and parallel internal baffles extending radially inside said duct to said outer wall and being parallel to the axis of rotation of said duct, said stream being rotated at a speed of rotation sufficient to impel fluid denser constituents outwardly in said fluid to collect on said outer wall and causing said constituents by the centrifugal force exerted thereon to flow in a direction generally opposite to the direction of flow of said fluid stream to a point removed from the boundaries of said fluid stream, and recovering a constituent-depleted fluid and said fluid denser constituents.

* * * * *